(12) United States Patent
Paap et al.

(10) Patent No.: US 7,274,846 B1
(45) Date of Patent: Sep. 25, 2007

(54) FIBER OPTIC RIBBON SUBUNITS HAVING ENDS WITH DIFFERENT SHAPES

(75) Inventors: Mark T. Paap, Hickory, NC (US); Michael J. Gimblet, Conover, NC (US)

(73) Assignee: Corning Cable Systems, LLC., Hickory, NC (US)

( * ) Notice: Subject to any disclaimer, the term of this patent is extended or adjusted under 35 U.S.C. 154(b) by 0 days.

(21) Appl. No.: 11/540,187

(22) Filed: Sep. 29, 2006

(51) Int. Cl.
*G02B 6/44* (2006.01)

(52) U.S. Cl. ............ 385/114; 385/100; 385/128; 385/141

(58) Field of Classification Search ......... 385/100, 385/111, 112, 110, 113, 114, 127, 128, 141, 385/11
See application file for complete search history.

(56) References Cited

U.S. PATENT DOCUMENTS

| | | | |
|---|---|---|---|
| 4,547,040 A | 10/1985 | Yamamoto et al. | 350/96.34 |
| 4,653,852 A | 3/1987 | Suzuki et al. | 350/96.33 |
| 4,752,112 A | 6/1988 | Mayr | 350/96.23 |
| 4,861,135 A | 8/1989 | Rohner et al. | 350/96.23 |
| 4,900,126 A | 2/1990 | Jackson et al. | 350/46.23 |
| 5,442,722 A | 8/1995 | DeCarlo | 385/114 |
| 5,457,762 A | 10/1995 | LochKovic et al. | 385/114 |
| 5,524,164 A | 6/1996 | Hattori et al. | 385/114 |
| 5,598,498 A | 1/1997 | Comezzi | 385/114 |
| 5,673,352 A | 9/1997 | Bauer et al. | 385/114 |
| 5,717,805 A | 2/1998 | Stulpin | 385/114 |
| 5,761,363 A | 6/1998 | Mills | 385/114 |
| 5,905,835 A | 5/1999 | Bourghelle et al. | 385/114 |
| 5,933,559 A | 8/1999 | Petisce | 385/114 |
| 5,970,196 A | 10/1999 | Greveling et al. | 385/114 |
| 5,982,968 A | 11/1999 | Stulpin | 385/114 |
| 6,018,605 A | 1/2000 | Mills et al. | 385/114 |
| 6,028,976 A | 2/2000 | Sato et al. | 385/114 |
| 6,097,866 A | 8/2000 | Yang et al. | 385/114 |
| 6,253,013 B1 | 6/2001 | LochKovic et al. | 385/114 |

(Continued)

FOREIGN PATENT DOCUMENTS

EP 0843187 A1 5/1998

(Continued)

OTHER PUBLICATIONS

N. Andrew Punch, Jr., Shail K. Moorjani, Steven T. Bissell, and Karen E. Williams, Craft-Friendly 24-Fiber Ribbon Design, IWCS 1999, pp. 72-78.

(Continued)

*Primary Examiner*—Brian M. Healy

(57) ABSTRACT

A fiber optic ribbon having a plurality of optical fibers held together by a matrix material is disclosed. The matrix material has a first end with a first shape and a second end with a second shape, where the first shape is different than the second shape. In one embodiment, the first end has a concave end portion and the second end has a convex end portion. The fiber optic ribbon is advantageous as a subunit of a larger ribbon since the first end of a first subunit can interlock with a second end of a second subunit, thereby providing a robust structure. Moreover, the distance between optical fibers of adjacent subunits is reduced so the fiber optic ribbon may allow mass fusion splicing of same using standard splice chucks.

18 Claims, 4 Drawing Sheets

U.S. PATENT DOCUMENTS

| | | |
|---|---|---|
| 6,309,567 B1 | 10/2001 | Okuno et al. .............. 264/1.27 |
| 6,337,941 B1 | 1/2002 | Yang et al. ................. 385/114 |
| 6,381,390 B1 | 4/2002 | Hutton et al. ............... 385/114 |
| 6,483,972 B1 * | 11/2002 | Thompson et al. ......... 385/114 |
| 6,731,844 B2 | 5/2004 | Conrad et al. .............. 385/114 |
| 6,801,695 B2 | 10/2004 | Lanier et al. ............... 385/100 |
| 6,853,783 B2 | 2/2005 | Chiasson et al. ........... 385/114 |
| 7,085,459 B2 | 8/2006 | Conrad et al. .............. 385/114 |
| 2002/0025128 A1 | 2/2002 | Hwang ....................... 385/114 |

FOREIGN PATENT DOCUMENTS

| | | |
|---|---|---|
| EP | 0856761 | 8/1998 |
| EP | 0856761 A1 | 8/1998 |
| EP | 0749129 | 5/2000 |
| EP | 0749129 B1 | 5/2000 |
| JP | 1-138517 | 5/1989 |
| JP | 1-138518 | 5/1989 |
| JP | 1-251005 | 10/1989 |
| JP | 07-120645 | 5/1995 |
| JP | 07120645 A | 5/1995 |
| JP | 08-129122 | 5/1996 |
| JP | 08129122 A | 5/1996 |
| JP | 08-262292 | 10/1996 |
| JP | 08262292 A | 10/1996 |
| JP | 09-113773 | 5/1997 |
| JP | 09113773 A | 5/1997 |
| JP | 09-197213 | 7/1997 |
| JP | 09197213 A | 7/1997 |
| JP | 09-218328 | 8/1997 |
| JP | 09218328 A | 8/1997 |
| WO | 94/23323 | 10/1994 |
| WO | WO94/23323 | 10/1994 |
| WO | 97/05515 | 2/1997 |
| WO | WO97/05515 | 2/1997 |

OTHER PUBLICATIONS

R.S. Wagman, G.A. Lochkovic, K.T. White, "Component Optimization for Slotted Core Cables Using 8-Fiber Ribbons", IWCS 1995, pp. 472-478.

* cited by examiner

FIBER OPTIC RIBBON SUBUNITS HAVING ENDS WITH DIFFERENT SHAPES

FIELD OF THE INVENTION

The present invention relates generally to fiber optic ribbons. More specifically, the present invention relates to fiber optic ribbons having ends with different shapes.

BACKGROUND OF THE INVENTION

Fiber optic ribbons include optical waveguides such as optical fibers that transmit optical signals, for example, voice, video, and/or data information. Fiber optic cables using fiber optic ribbons can result in a relatively high optical fiber-density. Fiber optic ribbon configurations can be generally classified into two general categories. Namely, fiber optic ribbons with subunits and those without. A fiber optic ribbon with a subunit configuration, for example, includes at least one optical fiber surrounded by a primary matrix forming a first subunit, and a second subunit having a similar construction (with its own discreet primary matrix), which are connected and/or encapsulated by a secondary matrix. On the other hand, fiber optic ribbons without subunits generally have a plurality of optical fibers surrounded by a single primary matrix material.

Optical fiber ribbons should not be confused with microcables that, for example, have a strength member and a jacket. For instance, U.S. Pat. No. 5,673,352 discloses a micro-cable having a core structure and a jacket. The core structure requires that at least one optical fiber is positioned between longitudinally extending strength members, both of which are embedded in a buffer material. The jacket of the '352 patent protects the core structure and the material is selected to have good adhesion to the buffer material and be abrasion resistant. Additionally, the strength members are required to have a larger diameter than the diameter of the optical fiber, thereby absorbing crushing forces that are applied to the microcable.

On the other hand, optical fiber ribbons generally have a plurality of adjacent optical fibers arranged in a generally planar array forming a relatively high optical fiber density with a relatively small cross-sectional footprint. Optical fiber ribbons without subunits can present problems for the craft. For example, when separating these optical fiber ribbons into a plurality of optical fiber subsets, the craft must use expensive precision tools for "cleanly" separating the optical fiber ribbon. Where the craft elects to separate the optical fiber ribbon into subsets by hand, or with a tool lacking adequate precision, stray optical fibers and/or damage to the optical fibers can result. Stray optical fibers can cause problems in optical ribbon connectorization, organization, stripping, and splicing. Furthermore, damage to the optical fibers is undesirable and can render the optical fiber inoperable for its intended purpose.

However, there are fiber optic ribbon configurations that attempt to aid the separation of fiber optic ribbons without using subunits. For example, U.S. Pat. No. 5,982,968 requires an optical fiber ribbon of uniform thickness having V-shaped stress concentrations in the matrix material that extend along the longitudinal axis of the fiber optic ribbon. V-shaped stress concentrations can be located across from each other on the planar surfaces of the fiber optic ribbon, thereby aiding the separation of the fiber optic ribbon into a plurality of subsets. However, the '968 patent requires a wider fiber optic ribbon because additional matrix material is required adjacent to the optical fibers near the V-shaped stress concentrations to avoid stray optical fibers after separation. A wider ribbon requires more matrix material and decreases the optical fiber density. Moreover, this wider spacing complicates mass fusion splicing of the entire fiber optic ribbon. Simply stated, the optical fibers of the wider ribbon do not have a uniform spacing like a conventional fiber optic ribbon and, thus, the spacing does not match the spacing for a conventional chuck of the fusion splicer. Another embodiment of the '968 patent requires applying a thin layer of a first matrix material around optical fibers to improve geometry control such as planarity of the optical fibers. Then V-shaped stress concentrations are formed in a second matrix applied over the first matrix material, thereby allowing separation of the subsets at the stress concentrations.

Another example of a separable fiber optic ribbon is described in U.S. Pat. No. 5,970,196. More specifically, the '196 patent requires a pair of removable sections positioned in V-shaped notches located across from each other on opposite sides of the planar surfaces of an optical fiber ribbon. The removable sections are distinct from the primary matrix and are positioned between adjacent interior optical fibers of the optical fiber ribbon to facilitate the separation of the optical fiber ribbon into subsets at the V-shaped notches. The removable sections can either be flush with the planar surfaces of the optical fiber ribbon, or they may protrude therefrom. These known fiber optic ribbons have several disadvantages. For example, they can be more expensive and difficult to manufacture because of the added complexity of the distinct removable sections. Additionally, from an operability standpoint, the V-shaped stress concentrations and/or V-shaped notches can undesirably affect the robustness of the optical fiber ribbon and/or induce microbending in the optical fibers.

Optical fiber ribbons having subunits can have several advantages, for example, improved separation, and avoidance of stray fiber occurrences. A conventional optical fiber ribbon 1 employing subunits encapsulated in a secondary matrix is shown in FIG. 1. In particular, optical fiber ribbon 1 includes a pair of conventional subunits 2 having optical fibers 3 encapsulated in a primary matrix 5, which are then encapsulated in a secondary matrix 4. The thickness T1 of primary matrix 5 is continuous and uniform. Likewise, the thickness t1 of the secondary matrix 4 covering the planar portions of subunits 2 is continuous and uniform. For example, subunit 2 can include six 250 µm optical fibers 3 disposed in primary matrix 5 having an overall uniform thickness T1 of 310 µm and secondary matrix 4 has a thickness t1 of 10 µm for an overall fiber optic ribbon thickness T2 of 330 µm.

However, conventional optical fiber ribbon 1 having subunits 2 has disadvantages. For example, one concern is the potential formation of wings W (FIG. 1) during hand separation of subunits 2. Wings W can be caused by, for example, a lack of sufficient adhesion between common matrix 4 and subunit matrix 5 and/or random fracturing of the secondary matrix during separation. The existence of wings W can negatively affect, for example, optical ribbon organization, connectorization, stripping, and/or splicing operations by the craft. Additionally, wings W can cause problems with ribbon identification markings, or compatibility of the subunit with ribbon handling tools, for example, thermal strippers, splice chucks, and fusion splicers. Furthermore, the abutting subunits can increase the spacing between the adjacent optical fibers of the subunits. Thus, the spacing of the optical fibers of the subunitized ribbon does not match the spacing for a conventional chuck of the fusion splicer. The present invention overcomes the issues associated with prior optical fiber ribbons.

SUMMARY OF THE INVENTION

The present invention is directed to fiber optic ribbons having a plurality of optical fibers held together by a matrix material. In one embodiment, the matrix material has a first end with a first shape and a second end with a second shape, where the first shape is different than the second shape. By way of example, the first end has a concave end portion and the second end has a convex end portion.

Fiber optic ribbons of the present invention are advantageous as subunits of a larger ribbon since the first end of a first subunit can interlock with a second end of a second subunit, thereby providing a robust structure. Moreover, the distance between optical fibers of adjacent subunits is reduced so the fiber optic ribbon may allow mass fusion splicing of same using standard splice chucks. Illustratively, a first subunit has a head end with a first shape and a tail end with a second shape and the first shape of the head end is different than the second shape of the tail end. Likewise, a second subunit has a head end with a first shape and a tail end with a second shape and the first shape of the head end is different than the second shape of the tail end. The first subunit and the second subunit are held together by a secondary matrix so that the head end of the second subunit is adjacent to the tail end of the first subunit thereby allowing an interlocking relationship between the first subunit and the second subunit.

In further embodiments, fiber optic ribbons of the present invention can inhibit the formation of wings in a secondary matrix during hand separation of the same. More specifically, the head end and the tail end of the first subunit may protrude beyond a major first primary matrix material plane of the first subunit. Likewise, the head end and the tail end of the second subunit protrude beyond a major second primary matrix material plane of the second subunit. Consequently, a secondary matrix that holds the first subunit and the second subunit together has a local minimum thickness near the subunit interface for influencing the initiation of fracture of the same near the subunit interface for inhibiting the formation of wings in the secondary matrix.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain principals and operations of the invention.

DETAILED DESCRIPTION OF THE INVENTION

Figure 1:
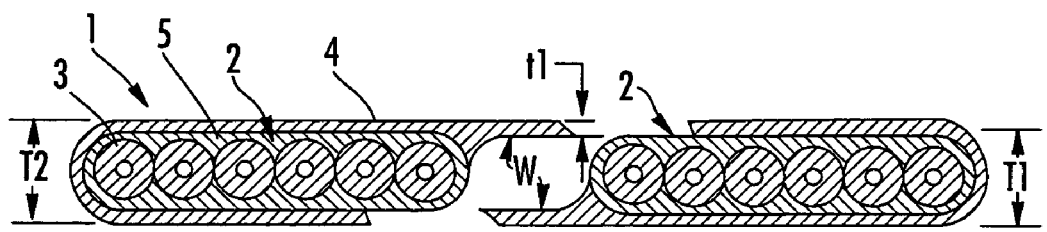
FIG. 1 depicts a cross-section of a conventional fiber optic ribbon having subunits.
Figure 2:
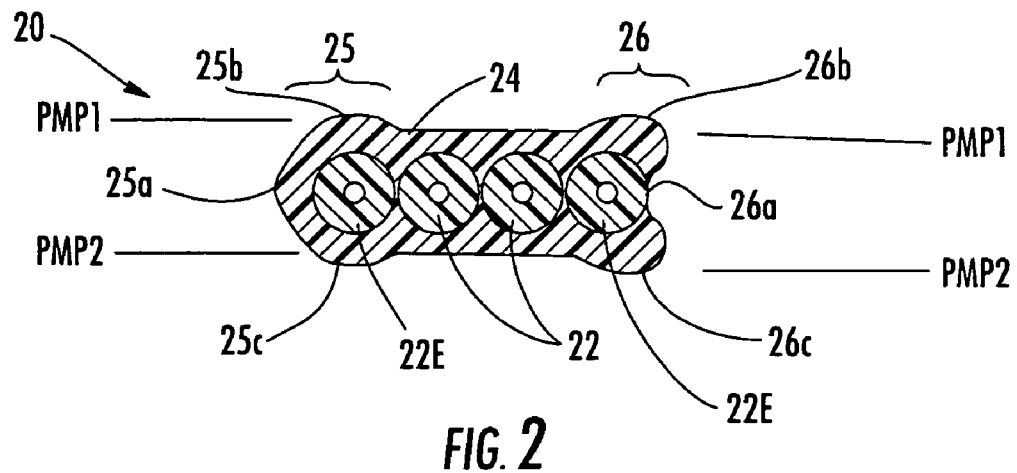
FIG. 2 is a cross-sectional view of a fiber optic ribbon according to the present invention.
Figure 5:
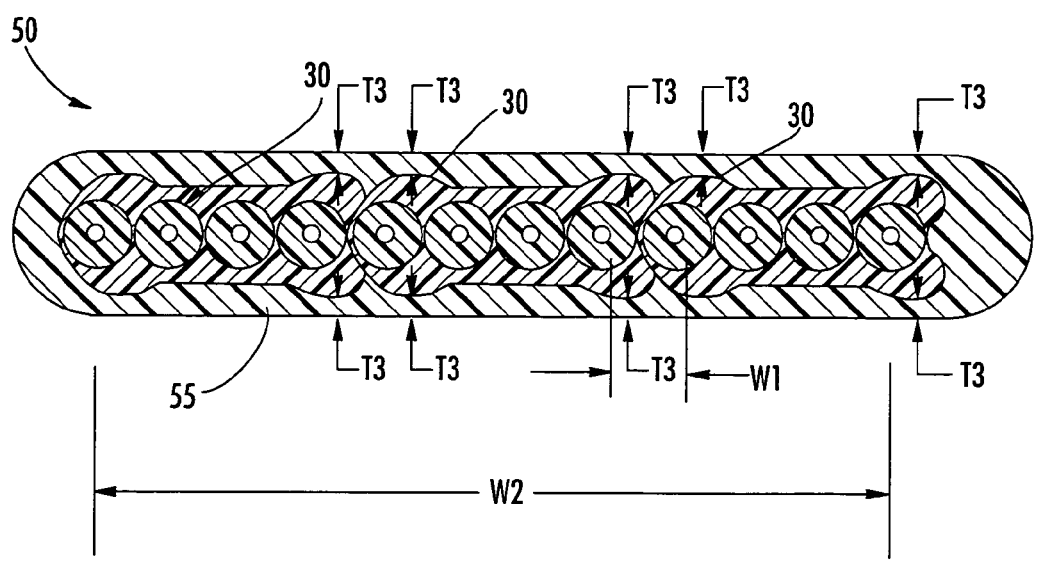
FIG. 5 is a cross-sectional view of a splittable fiber optic ribbon according to the present invention.

Reference will now be made in detail to the present preferred embodiments of the invention, examples of which are illustrated in the accompanying drawings. Whenever practical, the same reference numerals will be used throughout the drawings to refer to the same or like parts. FIG. 2 depicts a cross-sectional view of a fiber optic ribbon 20 according to the present invention. Fiber optic ribbon 20 includes a plurality of optical fibers 22 held together by primary matrix material 24 in a generally planar configuration, thereby forming an elongate structure. Primary matrix 24 generally contacts optical fibers 22 and may encapsulate the same, thereby providing a robust structure for processing and handling. Primary matrix material 24 also includes a first end 25 having a first shape and a second end 26 having a second shape, where the second shape is different from first shape as shown. For instance, first end 25 has a concave end portion 25a and second end 26 has a convex end portion 26a. Moreover, a portion of first end 25 and a portion of second end 26 protrude beyond a first major primary matrix plane PMP1 and are respectively labeled as protrusions 25b and 26b. Likewise, another portion 25c of first end 25 and another portion 26c of second end 26 protrude beyond a second major primary matrix plane PMP2 and are respectively labeled as protrusions 25c and 26c. Generally speaking, fiber optic ribbon 20 has arrow-like shape having a head end (i.e., first end 25) and a tail end (i.e., second end 26), but other shapes are possible using the concepts of the invention. Fiber optic ribbons of the present invention can, for example, be used as a stand alone ribbon, a portion of a ribbon stack, or as a portion of a fiber optic cable. However, fiber optic ribbons of the present invention are especially advantageous as a subunit of a larger ribbon as depicted in FIG. 5 and discussed below.

Figure 3:
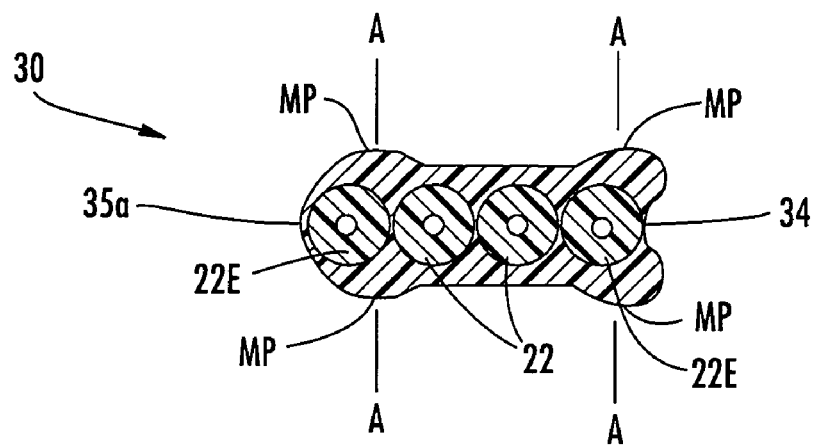
FIG. 3 is a cross-sectional view of another fiber optic ribbon according to the present invention.

By way of example, protrusions 25b and 25c of first end 25 and protrusions 26b and 26c of second end 26 protrude beyond respective major primary matrix planes PMP1 and PMP2 by about 3 microns or more, such as about 5 microns, but may protrude up to 50 microns or more. Protrusions 25b, 25c, 26b, 26c are shown as generally convex profiles, but may have any suitable profile such as angular or the like for creating the desired characteristics. FIG. 3 depicts a fiber optic ribbon 30 that is similar to fiber optic ribbon 20, but has a reduced thickness of primary matrix 34 at a concave end portion 35a. Consequently, fiber optic ribbon 30 is especially advantageous as a subunit of a larger ribbon (see FIG. 5) since it reduces a distance between optical fibers of adjacent subunits W1 along with reducing a distance between outboard optical fibers W2 of the larger ribbon. As shown in FIG. 3, the protrusions of the fiber optic ribbon have a maximum protrusion MP that is generally disposed above an edge optical fiber 22E. In other words, a line A-A drawn vertically through the maximum protrusion MP intersects a portion of the edge optical fiber 22E. As depicted, fiber optic ribbons 20 and 30 have four optical fibers, but any suitable number of optical fibers is possible for ribbons according to the present invention. Likewise, the concepts of the present invention are suitable for use with fiber optic ribbons having other dimensions and/or structures.

The concepts of the present invention should not be confused with conventional ribbons that may have undulations across their cross-sectional surface due to manufacturing variations. These undulations can cause variations in the conventional ribbon thickness at random locations, rather than, for instance, predetermined shapes. For example, the thickness of the conventional ribbon can be 310±3 microns at random locations across the cross-section. On the other hand, ribbons according to the present invention have a predetermined geometry at the end portions of the primary matrix thereby allowing: (1) interlocking of the fiber optic ribbons when used as subunits for providing a robust ribbon structure (i.e., the head end of a first subunit fits into a tail end of a second subunit); (2) reduction of the distance between optical fibers of adjacent subunits W1, thereby reducing the distance between extreme outboard optical fibers W2 of a larger ribbon (see FIG. 5) for allowing the use of a standard splice chuck; and/or (3) creation of a local minimum thickness in the secondary matrix that inhibits the formation of wings when splitting subunits out of larger ribbons.

Primary matrix material 24 may be, for instance, a radiation curable material or a polymeric material; however, other suitable materials are possible. By way of example, one suitable UV curable material is a polyurethane acrylate resin commercially available such as sold under the tradename 950-706 by DSM Desotech, Inc. of Elgin, Ill. Of course, other suitable UV materials are possible such as polyester acrylate resins that are commercially available from Borden Chemical, Inc. of Columbus, Ohio. As known, the degree of cure (i.e., cross-link density) affects the mechanical characteristics of the radiation curable material. For example, a significantly cured material can be defined as one with a high cross-link density for the material, which can be too brittle. Further, an undercured material can be too soft and possibly have a relatively high coefficient of friction (COF) that causes an undesirable level of ribbon friction. The cured UV material has a modulus in the range of about 50 MPa and about 1500 MPa depending on the radiation dose. Different modulus values can provide varying degrees of performance with respect to characteristics such as hand separability and robustness of the ribbons. Additionally, thermoplastic materials such as polypropylene are possible as a matrix material.

Figure 4:
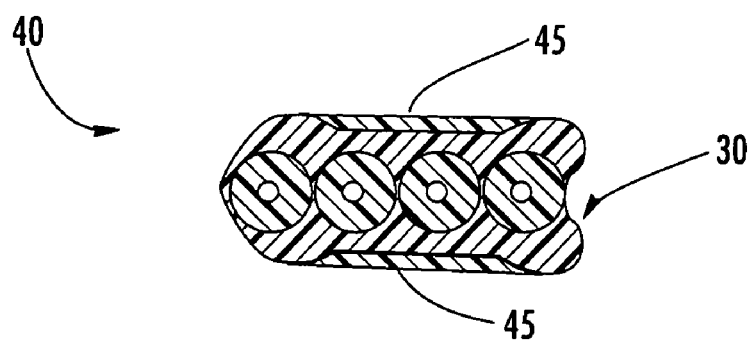
FIG. 4 is a cross-sectional view of the fiber optic ribbon of FIG. 2 that further includes a secondary matrix according to the present invention.

Variations on the concepts of the present invention are possible. For instance, FIG. 4 depicts a cross-sectional view of another fiber optic ribbon 40 according to the present invention. Fiber optic ribbon 40 is similar to fiber optic ribbon 30, but further includes a secondary matrix 45. As shown, secondary matrix 45 imparts a generally planar surface for fiber optic ribbon 40, thereby allowing for stacking of the fiber optic ribbons for providing a dense array of optical fibers. Using a secondary matrix advantageously allows the formation of relatively flat major surfaces of fiber optic ribbon 40. Moreover, the secondary matrix allows for the use of a different material and/or cure property, thereby allowing for the tailoring of the coeffiecient of friction (or other properties) at the outer surface of the fiber optic ribbon. Additionally, variations on fiber optic ribbon 40 include having a secondary matrix that entirely encapsulates fiber optic ribbon 30 (i.e., the secondary matrix covers the ends of fiber optic ribbon 30).

As previously stated, fiber optic ribbons of the present invention are especially advantageous as subunits of larger fiber optic ribbons. By way of example, FIG. 5 depicts a cross-sectional view of an explanatory fiber optic ribbon 50 according to the present invention. Fiber optic ribbon 50 includes three fiber optic ribbons 30 as subunits of fiber optic ribbon 50. Fiber optic ribbon 50 also includes a secondary matrix 55 for imparting generally flat major surfaces to fiber optic ribbon 50.

Simply stated, fiber optic ribbon 50 is advantageous since it reduces the distance between outboard optical fibers W2 compared with conventional fiber optic ribbons having subunits. Thus, fiber optic ribbon 50 allows mass fusion splicing of same using standard splice chucks with the fusion splicer. Stated another way, optical fibers of adjacent subunits 30 of fiber optic ribbon 50 are positioned closely together (i.e., nearly abutting arrangement). Moreover, fiber optic ribbon 50 is configured for hand splitting into three subunits each having four optical fibers. In other words, fiber optic ribbon 50 influences the location for the initiation of the fracture of the secondary matrix at a predetermined location during hand separation for inhibiting the formation of wings.

Specifically, secondary matrix 55 has a plurality of minimum local thicknesses T3 located adjacent to the subunit interfaces due to the protrusions of fiber optic ribbons 30. Local minimum thickness T3 is about 10 microns or less, but other suitable dimension are possible. Consequently, the fracture of secondary matrix 55 initiates at this local minimum thickness T3 of secondary matrix 55, thereby inhibiting the formation of wings during hand separation. Of course, other optical fiber ribbons having subunits according to the invention can include any desirable number optical fibers, subsets, and/or optical fibers per subset. Thus, the craft can easily separate the individual subunits 30 from fiber optic ribbon 50.

Figure 6:
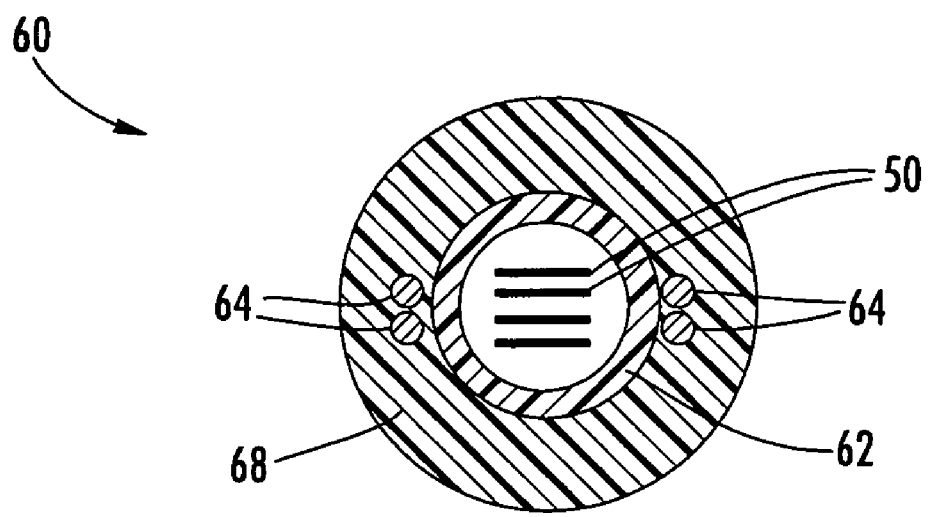
FIGS. 6 and 7 are cross-sectional views of fiber optic cables having fiber optic ribbons according to the present invention.
Figure 7:
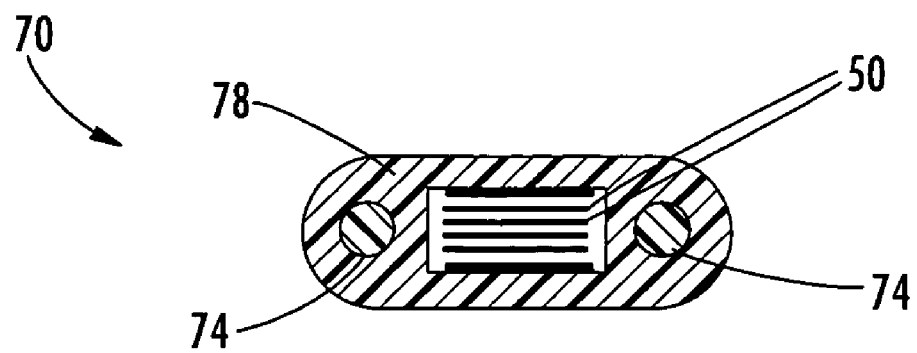

Fiber optic ribbon of the present invention can, for example, be used as a stand alone ribbon, a portion of a ribbon stack, or as a portion of a fiber optic cable. Illustratively, FIG. 6 depicts a cross-sectional view of an explanatory fiber optic cable having a plurality of fiber optic ribbons 50 represented as solid lines. Fiber optic cable 60 houses fiber optic ribbons 50 in a buffer tube 62 that may include a suitable filling material such as a grease, gel, yarn, or one or more dry inserts. Filling materials are useful for providing one or more functions such as cushion, coupling, waterblocking, or the like. Fiber optic cable 60 also includes a plurality of strength members 62 and a cable jacket 68. Of course, fiber optic ribbons may be used in any suitable fiber optic cable. FIG. 7 depicts a tubeless fiber optic cable 70 having a plurality of fiber optic ribbons 50 according to the present invention. Fiber optic cable 70 has a generally rectangular cavity for housing a plurality of optical fiber ribbons 50 and may include one or more filling materials. Strength members 74 provide tensile strength for the cable and cable jacket 78 has a generally flat shape.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A fiber optic ribbon comprising:
   a plurality of optical fibers; and
   a matrix material, the matrix material holding the plurality of optical fibers together and having a first end with a first shape and a second end with a second shape, wherein the first shape is different than the second shape and a portion of the first end and a portion of the second end protrude about 3 microns or more beyond a major primary matrix material plane.

2. The fiber optic ribbon of claim 1, wherein the first end has a concave end portion and the second end has a convex end portion.

3. The fiber optic ribbon of claim 1, wherein the fiber optic ribbon further includes a secondary matrix material.

4. The fiber optic ribbon of claim 1, wherein the fiber optic ribbon is a subunit of a larger fiber optic ribbon.

5. The fiber optic ribbon of claim 1, wherein the fiber optic ribbon is a subunit of a larger fiber optic ribbon having a plurality of subunits and the plurality of subunits each include the same number of optical fibers.

6. The fiber optic ribbon of claim 1, wherein the fiber optic ribbon further includes a secondary matrix and the secondary matrix has a secondary local minimum thickness of about 10 microns or less.

7. The fiber optic ribbon of claim 1, wherein the fiber optic ribbon is a portion of a fiber optic cable.

8. A fiber optic ribbon comprising:
   a first subunit, the first subunit having a plurality of optical fibers and a first primary matrix material, the first primary matrix material holding the plurality of optical fibers of the first subunit together, wherein the first subunit has a head end with a first shape and a tail end with a second shape and the first shape of the head end is different than the second shape of the tail end and a portion of the head end of the first subunit and a portion of the tail end of the first subunit protrude about 3 microns or more beyond a major primary matrix material plane;
   a second subunit, the second subunit having a plurality of optical fibers and a second primary matrix material, the second primary matrix material holding the plurality of optical fibers of the second subunit together, wherein the second subunit has a head end with a first shape and a tail end with a second shape and the first shape of the head end is different than the second shape of the tail end; and
   a secondary matrix, the secondary matrix holding the first subunit and the second subunit together so that the head end of the second subunit is adjacent to the tail end of the first subunit thereby allowing an interlocking relationship between the first subunit and the second subunit.

9. The fiber optic ribbon of claim 8, wherein the head end of the first subunit has a concave end portion and the tail end of the second subunit has a convex end portion.

10. The fiber optic ribbon of claim 8, wherein the first subunit and the second subunit each include the same number of optical fibers.

11. The fiber optic ribbon of claim 8, wherein the secondary matrix has a secondary local minimum thickness of about 10 microns or less.

12. The fiber optic ribbon of claim 8, wherein the fiber optic ribbon is a portion of a fiber optic cable.

13. A fiber optic ribbon comprising:
   a first subunit, the first subunit having a plurality of optical fibers and a first primary matrix material, the first primary matrix material holding the plurality of optical fibers of the first subunit together, wherein the first subunit has a head end with a first shape and a tail end with a second shape and the first shape of the head end is different than the second shape of the tail end, wherein the head end and the tail end of the first subunit protrude beyond a major first primary matrix material plane of the first subunit;
   a second subunit, the second subunit having a plurality of optical fibers and a second primary matrix material, the second primary matrix material holding the plurality of optical fibers of the second subunit together, wherein the second subunit has a head end with a first shape and a tail end with a second shape and the first shape of the head end is different than the second shape of the tail end, wherein the head end and the tail end of the second subunit protrude beyond a major second primary matrix material plane of the second subunit; and
   a secondary matrix, the secondary matrix holding the first subunit and the second subunit together so that the head end of the second subunit is adjacent to the tail end of the first subunit thereby allowing an interlocking relationship between the first subunit and the second subunit.

14. The fiber optic ribbon of claim 13, wherein the head end of the first subunit has a concave end portion and the tail end of the second subunit has a convex end portion.

15. The fiber optic ribbon of claim 13, wherein a portion of the head end of the first subunit and a portion of the tail end of the first subunit protrude about 3 microns or more beyond a major primary matrix material plane of the first subunit.

16. The fiber optic ribbon of claim 13, wherein the first subunit and the second subunit each include the same number of optical fibers.

17. The fiber optic ribbon of claim 13, wherein the secondary matrix has a secondary local minimum thickness of about 10 microns or less.

18. The fiber optic ribbon of claim 13, wherein the fiber optic ribbon is a portion of a fiber optic cable.

* * * * *